(12) United States Patent
Omori et al.

(10) Patent No.: US 11,797,815 B2
(45) Date of Patent: Oct. 24, 2023

(54) CONTAINER INCLUDING RFID MODULE

(71) Applicant: Murata Manufacturing Co., Ltd., Nagaokakyo (JP)

(72) Inventors: Ryohei Omori, Nagaokakyo (JP); Noboru Kato, Nagaokakyo (JP); Hirokazu Yazaki, Nagaokakyo (JP); Mikiko Saito, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 17 days.

(21) Appl. No.: 17/728,279

(22) Filed: Apr. 25, 2022

(65) Prior Publication Data

US 2022/0245419 A1    Aug. 4, 2022

Related U.S. Application Data

(63) Continuation of application No. PCT/JP2021/037397, filed on Oct. 8, 2021.

(30) Foreign Application Priority Data

Nov. 9, 2020    (JP) .................................. 2020-186686

(51) Int. Cl.
*G06K 19/07*    (2006.01)

(52) U.S. Cl.
CPC ................................ *G06K 19/0723* (2013.01)

(58) Field of Classification Search
CPC ................................................ G06K 19/0723
USPC ........................................................ 235/492
See application file for complete search history.

(56) References Cited

U.S. PATENT DOCUMENTS

| 2009/0008460 A1 | 1/2009 | Kato |
| 2009/0027210 A1 | 1/2009 | Sakama et al. |

FOREIGN PATENT DOCUMENTS

| JP | 2009031893 A | 2/2009 |
| JP | 2020021389 A | 2/2020 |
| WO | 2009004827 A1 | 1/2009 |
| WO | 2019039484 A | 2/2019 |
| WO | 2019039484 A1 | 2/2019 |

OTHER PUBLICATIONS

International Search Report issued for PCT/JP2021/037397, dated Dec. 21, 2021.
Written Opinion of the International Searching Authority issued for PCT/JP2021/037397, dated Dec. 21, 2021.

*Primary Examiner* — Allyson N Trail
(74) *Attorney, Agent, or Firm* — ArentFox Schiff LLP

(57) ABSTRACT

A container is provided that includes an RFID module, and further includes an insulating base material that forms an outer shape of the container; a metal film formed on a first main surface of the insulating base material; and a slit formed in the metal film. Moreover, the RFID module includes an RFIC element, a filter circuit that transmits a current caused by an electromagnetic wave at a unique resonance frequency serving as a communication frequency to the RFIC element, and first and second electrodes connected to the filter circuit. The metal film is formed to wrap around an outer periphery of the container in a direction intersecting the slit, and the first and second electrodes of the RFID module are electrically connected to the metal film across the slit formed between the first electrode and the second electrode.

20 Claims, 17 Drawing Sheets

CONTAINER INCLUDING RFID MODULE

CROSS REFERENCE TO RELATED APPLICATIONS

This application is a continuation of PCT Application No. PCT/JP2021/037397, filed Oct. 8, 2021, which claims priority to Japanese Patent Application No. 2020-186686, filed Nov. 9, 2020, the entire contents of each of which are hereby incorporated in their entirety.

TECHNICAL FIELD

The present invention relates to a container including a radio frequency identification (RFID) module, and, more particularly, to a container including an RFID module using an RFID technique to perform data communication in a non-contact manner with an induced electromagnetic field or a radio wave.

BACKGROUND

It has been conventionally considered to manage a product in a container by attaching an RFID tag serving as a wireless communication device to the container. The RFID tag is formed on an insulating substrate, such as a paper material or a resin material, by using a metal material such as an antenna pattern together with a radio-frequency integrated circuit (RFIC). Unfortunately, when a metal film is formed on an outer surface of the container, the RFID tag cannot communicate due to influence of the metal film.

WO 2019/039484 A (hereinafter "Patent Document 1") discloses a container with an RFID tag as described above that has a configuration in which metal is formed in a part of the container without impairing design properties. Moreover, Patent Document 1 further discloses an RFID tag that works with the metal.

However, the RFID tag disclosed in Patent Document 1 includes an RFIC chip and an antenna pattern, and a metal film cannot be formed in regions of the RFIC chip and the antenna pattern on the container. Thus, a container having an RFID module is required in which deterioration in degree of freedom of design properties is further suppressed.

SUMMARY OF THE INVENTION

Accordingly, it is an object of the present invention to provide a container having an RFID module in which deterioration in design properties is suppressed in the container provided with a metal film.

In an exemplary aspect, a container including an RFID module is provided that includes an insulating base material that forms an outer shape of the container, a metal film formed on a first main surface of the insulating base material, and a slit formed in the metal film. The RFID module includes an RFIC element, a filter circuit that transmits a current caused by an electromagnetic wave at a unique resonance frequency serving as a communication frequency to the RFIC element, and first and second electrodes connected to the filter circuit. Moreover, the metal film is formed to wrap around an outer periphery of the container in a direction intersecting the slit, and the first electrode and the second electrode of the RFID module are electrically connected to the metal film across the slit formed between the first electrode and the second electrode.

In accordance with the exemplary aspects, a container is provided having an RFID module in which deterioration in design properties is suppressed in the container provided with a metal film.

DETAILED DESCRIPTION

Figure 1:
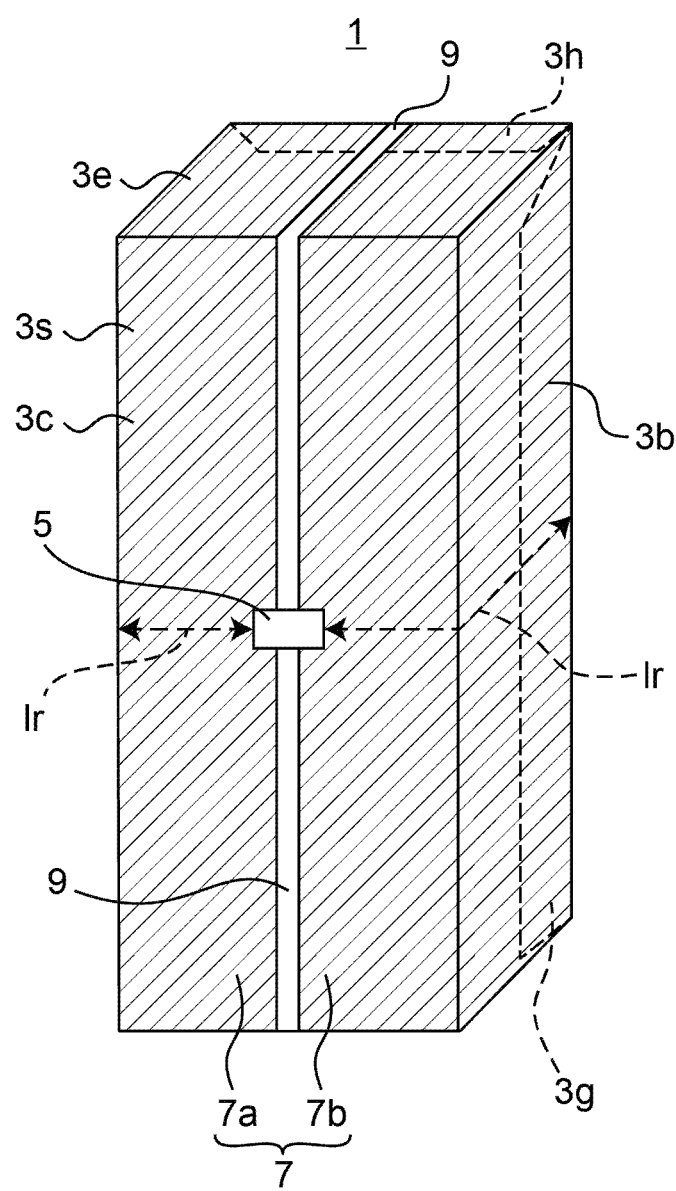
FIG. 1 is a general perspective view of a container of a first exemplary embodiment, the container having an RFID module.

In an exemplary aspect, a container is provided including an RFID module, and the further includes an insulating base material that forms an outer shape of the container, a metal film formed on a first main surface of the insulating base material, and a slit formed in the metal film. The RFID module includes an RFIC element, a filter circuit that transmits a current caused by an electromagnetic wave at a unique resonance frequency serving as a communication frequency to the RFIC element, and first and second electrodes connected to the filter circuit. Moreover, the metal film is formed to wrap around an outer periphery of the container in a direction intersecting the slit, and the first electrode and the second electrode of the RFID module are electrically connected to the metal film across the slit formed between the first electrode and the second electrode.

The container of this exemplary aspect is configured to use the metal film formed on the first main surface of the base material of the container as a loop antenna, so that the RFID module can be attached to the container provided with the metal film while suppressing any deterioration in degree of freedom of design properties.

When the metal film is irradiated with an electromagnetic wave at the communication frequency, a current flowing in a direction intersecting the slit is generated in the metal film, and the current flows through the metal film to circulate along the outer periphery of the container. When the current flows through the metal film to circulate along the outer periphery of the container as described above, communication characteristics as a loop antenna are obtained.

In an exemplary aspect, the metal film includes a first metal region connected to the first electrode of the RFID module and a second metal region connected to the second electrode of the RFID module. Moreover, the first metal region and the second metal region can be electrically connected to each other via capacitive coupling in an outer peripheral direction of the container. This configuration enables the first metal region and the second metal region to be electrically connected to each other via capacitive coupling, and further suppresses deterioration in degree of freedom of design properties due to the metal film.

Moreover, the container including the RFID module can be an assembled box in an exemplary aspect, in which the base material includes a first surface and a second surface that are side surfaces of the box and include the first main surface, and a flap that is continuous with the first surface and is provided for connecting the first surface and the second surface with an adhesive layer. The first metal region of the metal film can be formed on the flap, and the second metal region of the metal film can be formed on the second surface. This configuration enables facilitating electrical connection between the first metal region and the second metal region when the flap is connected to the second surface by the adhesive layer.

In yet an additional exemplary aspect, the slit can be formed in the flap, and the RFID module can be disposed on the flap. As a result, the RFID module disposed on the flap continuous with the first surface is attached to an inner surface of the second surface in the container, and thus does not appear on an outer surface of the container. Thus, the design properties of the container can be prevented from deteriorating.

In addition, the filter circuit can be an LC parallel resonant circuit. This configuration enables a current at a frequency matching the RFIC to flow through the RFIC.

The metal film can also have a sheet resistance of 0.5Ω/☐ (ohms per square) or more. Even this configuration enables a current to flow to the RFIC using an eddy current generated in the metal film because the RFID module has the filter circuit.

The metal film can further have a thickness of 1 nm or more and 500 nm or less in an exemplary aspect. This configuration enables a current to flow to the RFIC using an eddy current generated in the metal film because the RFID module has the filter circuit.

Exemplary embodiments described below are each a specific example of the present invention, and the present invention is not limited to a configuration of each of the embodiments. The embodiments below specifically show numerical values, shapes, configurations, steps, order of steps, and the like, which are merely examples and do not limit the present invention. Components in the embodiments below include components that are not described in independent claims indicating the highest concept and that are described as optional components. It is noted that every embodiment has modifications that are similar in configuration, and configurations described in the respective modifications may be combined.

When relative permittivity εr is more than 1, an antenna pattern and a conductor pattern each have an electrical length longer than a physical length. The electrical length in the present specification is a length in consideration of shortening or extension of a wavelength due to the relative permittivity or parasitic reactance.

First Exemplary Embodiment

Figure 2:
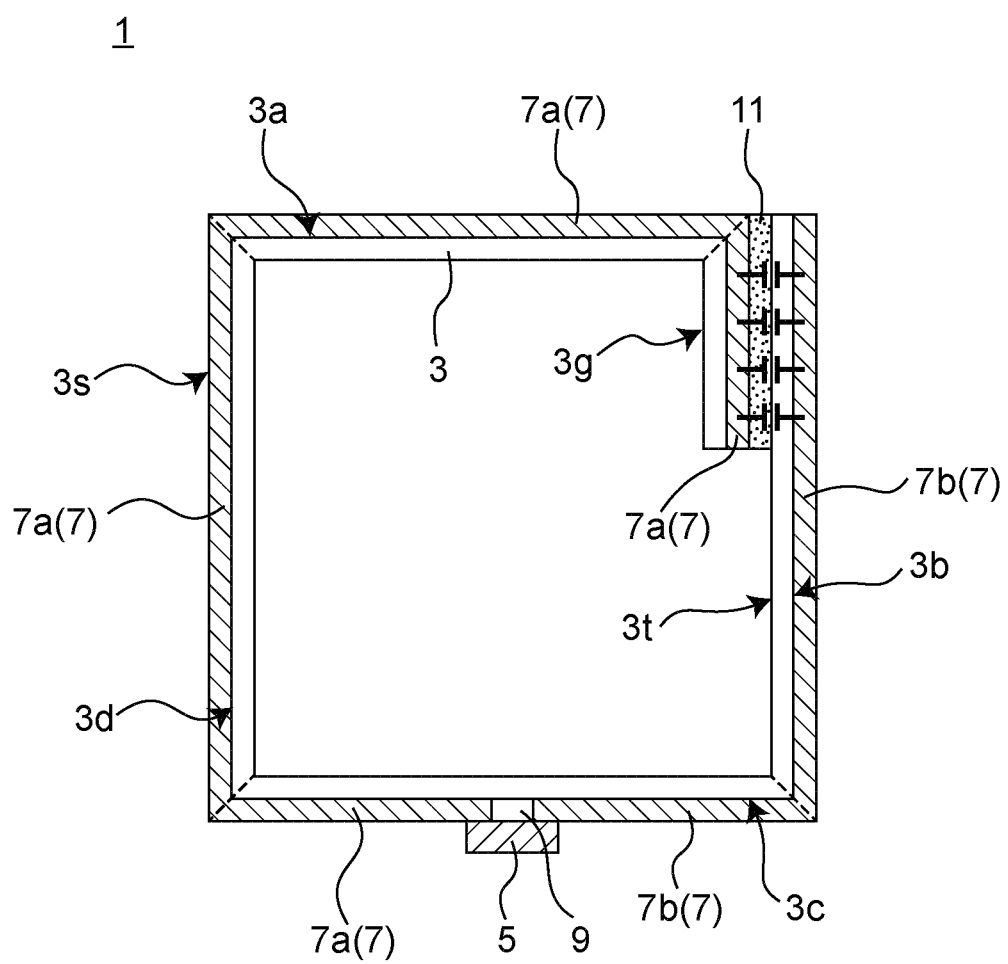
FIG. 2 is a schematic sectional view of the container in FIG. 1.
Figure 3:
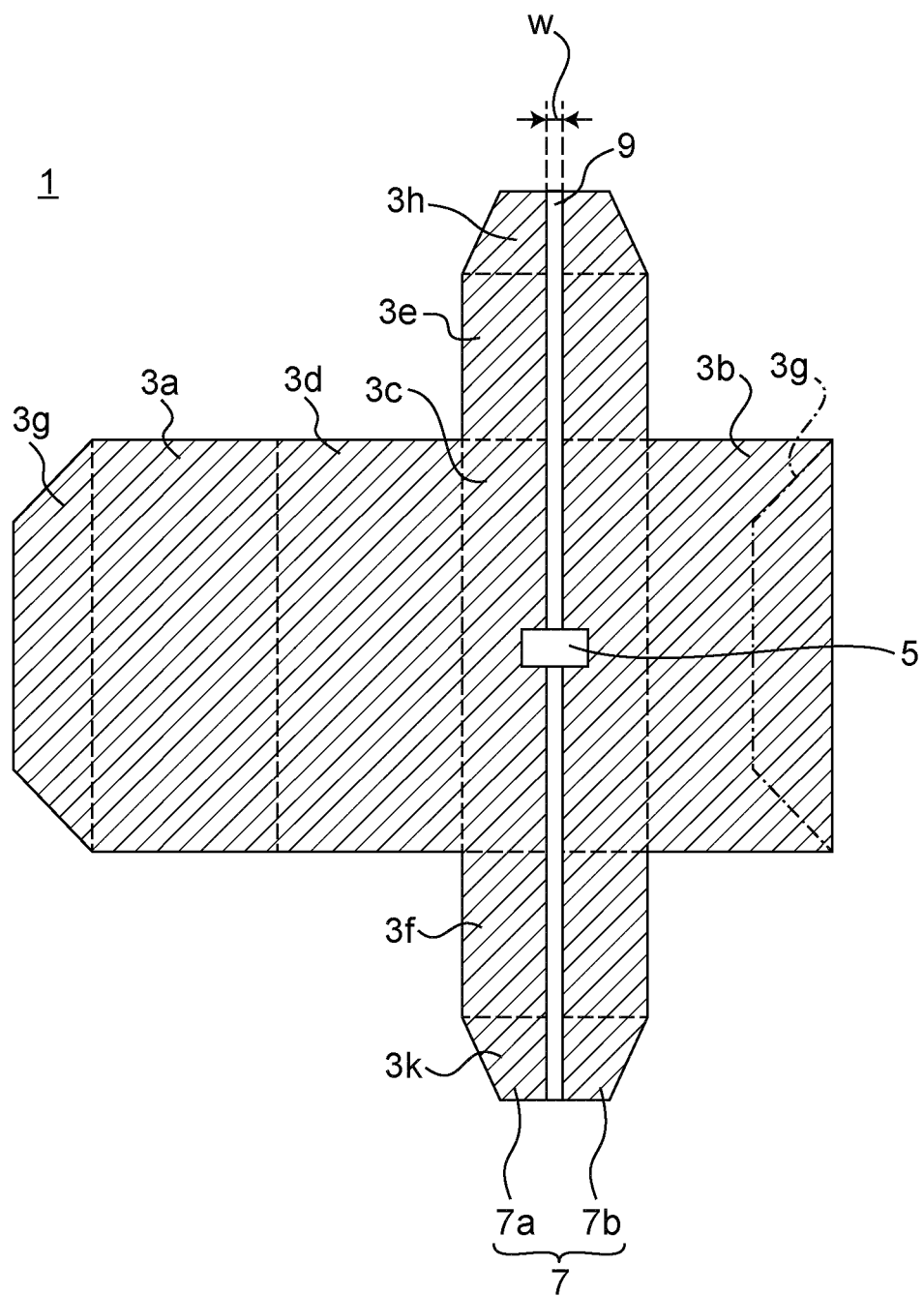
FIG. 3 is a developed view of the container in FIG. 1.

Next, a schematic configuration of a container 1 including an RFID module 5 will be described. FIG. 1 is a general perspective view of the container 1 according to a first exemplary embodiment, which includes the RFID module 5. FIG. 2 is a schematic sectional view of the container 1 in FIG. 1, and FIG. 3 is a developed view of the container 1 in FIG. 1. FIG. 2 is a schematic sectional view of the container 1 in FIG. 1 taken along a direction orthogonal to a side surface of the container 1 at a position where the RFID module 5 is disposed. FIG. 3 illustrates a part denoted by 3g and indicated by an alternate long and short dash line, the part indicating a part where a first flap 3g is connected to a back side of a second surface 3b.

As shown, the container 1 of the first embodiment includes a base material 3, the RFID module 5 attached to the base material 3, a metal film 7 formed on a first main surface 3s of the base material 3, and a slit 9 formed in the metal film 7.

In this exemplary aspect, the container 1 is formed into a three-dimensional shape by assembling the base material 3 in a planar shape as illustrated in FIG. 3, for example. The container 1 has, for example, a rectangular parallelepiped shape, and the base material 3 is made of an insulating material such as paper, resin, or plastic, for example.

Furthermore, the base material 3 includes a first surface 3a, the second surface 3b, a third surface 3c, a fourth surface 3d, a fifth surface 3e, a sixth surface 3f, the first flap 3g, a second flap 3h, and a third flap 3k. For example, the first surface 3a to the fourth surface 3d each form a side surface when assembled, the fifth surface 3e forms an upper or top surface when assembled, and the sixth surface 3f forms a lower or bottom surface when assembled. Moreover, the first main surface 3s of the base material 3 forms an outer surface (e.g., a front surface) of the container 1, and a second main surface 3t of the base material 3 forms an inner surface (e.g., back surface) of the container 1.

The first main surface 3s of the first flap 3g is attached to the second main surface 3t of the second surface 3b with an adhesive layer 11 interposed therebetween when assembled. The first main surface 3s of the second flap 3h is attached to the second main surface 3t of the first surface 3a with the adhesive layer 11 interposed therebetween when assembled. The first main surface 3s of the third flap 3k is attached to the second main surface 3t of the first surface 3a with the adhesive layer 11 interposed therebetween when assembled.

The metal film 7 is formed to wrap around an outer periphery of the container 1 in a direction intersecting the slit 9. In operation, the metal film 7 is configured to function as a loop antenna. The metal film 7 in the first embodiment is formed on the entire surface of the first main surface 3s of the base material 3 except for the slit 9. Moreover, the metal film 7 is made of a film of a conductive material such as aluminum foil or copper foil, and is formed by attaching a metal sheet, for example. When the metal film 7 is formed by using a metal having a small resistance value such as aluminum or copper, a communication distance can be increased. In an exemplary aspect, the metal film 7 has a thickness of more than 5 μm and 40 μm or less, for example. In alternative aspects, the metal film 7 may not be formed on the entire surface of the base material 3, and instead can be partially formed on the first flap 3g and another surface, for example.

The metal film 7 in the first embodiment includes a first metal region 7a and a second metal region 7b. The first metal region 7a and the second metal region 7b are physically separated (e.g., by the slit 9), and are electrically connected to each other via capacitive coupling in an outer peripheral direction of the container 1. That is, the metal film 7 includes a part where the slit 9 is formed, and where the first metal region 7a and the second metal region 7b are electrically insulated. The first metal region 7a and the second metal region 7b are electrically connected via capacitive coupling at a part where the slit 9 is not formed in the metal film 7. When the first metal region 7a is electrically connected to the second metal region 7b, there is no difference in potential between the first metal region 7a and the second metal region 7b, and then the metal film 7 functions as a loop antenna.

The first metal region 7a extends outward of the container 1 in the direction intersecting the slit 9. The second metal region 7b extends outward of the container 1 in a direction that is opposite to the first metal region 7a and intersects the slit 9. As illustrated in FIG. 3, the first metal region 7a in the first embodiment is formed in a region on the left of the slit 9. Specifically, the first metal region 7a is formed on the first surface 3a, a part of the third surface 3c, the fourth surface 3d, a part of the fifth surface 3e, a part of the sixth surface 3f, the first flap 3g, a part of the second flap 3h, and a part of the third flap 3k. The second metal region 7b is formed in a region on the right of the slit 9. Specifically, the second metal region 7b is formed on the second surface 3b, a part of the third surface 3c, a part of the second flap 3h, and a part of the third flap 3k.

As illustrated in FIG. 2, the first metal region 7a is formed in the first flap 3g. The second metal region 7b is formed on the second surface 3b. The first metal region 7a is connected to the second metal region 7b with the adhesive layer 11 and the base material 3 interposed therebetween. The adhesive layer 11 and the base material 3 have a total thickness designed in a size allowing the first metal region 7a and the second metal region 7b to be capacitively coupled to each other.

It is noted that although in the first embodiment, an example of the metal film 7 including the first metal region 7a and the second metal region 7b, the first metal region 7a and the second metal region 7b being electrically connected via capacitive coupling, has been described, the present invention is not limited to this configuration. For example, the first metal region 7a and the second metal region 7b can be electrically connected by being directly connected in an alternative aspect. Alternatively, the first metal region 7a and the second metal region 7b can be electrically connected by a conductor. In addition, the metal film 7 is not limited to two metal regions, and can have three or more metal regions that are electrically connected to each other.

When the container 1 is irradiated with an electromagnetic wave at a communication frequency, a current Ir flowing in the direction intersecting the slit 9 in the metal film 7 is generated as illustrated in FIG. 1. The current Ir flows through the metal film 7 to circulate along the outer periphery of the container 1. Specifically, the current Ir flows through the RFID module 5, the first metal region 7a, and the second metal region 7b to circulate along the outer periphery of the container 1.

Furthermore, the slit 9 is a groove formed in the metal film 7. The slit 9 forms a part that is electrically insulated by exposing the base material 3 from the metal film 7. In an exemplary aspect, the slit 9 has a width W of 1 mm, for example. The slit 9 may be formed by cutting away the metal film 7 after the metal film 7 is formed on the entire first main surface 3s of the base material 3, or may be formed by attaching two metal sheets to the first main surface 3s of the base material 3 at an interval of the width W of the slit 9. The slit 9 has a longitudinal length designed to allow the current Ir to flow in the direction intersecting the slit 9 in the metal film 7. The slit 9 in the first embodiment is formed in the third surface 3c, the fifth surface 3e, the sixth surface 3f, the second flap 3h, and the third flap 3k. Specifically, the slit 9 extends continuously from an end of the second flap 3h to an end of the third flap 3k through the fifth surface 3e, the third surface 3c, and the sixth surface 3f.

The RFID module 5 of the first embodiment is a wireless communication device configured to perform wireless communication (e.g., transmission and reception) using a high-frequency signal at a communication frequency (e.g., a carrier frequency). The RFID module 5 is configured to perform wireless communication with a high-frequency signal at a frequency for communication in a UHF band, for example. Here, the UHF band is a frequency band of 860 MHz to 960 MHz, for example.

Figure 4:
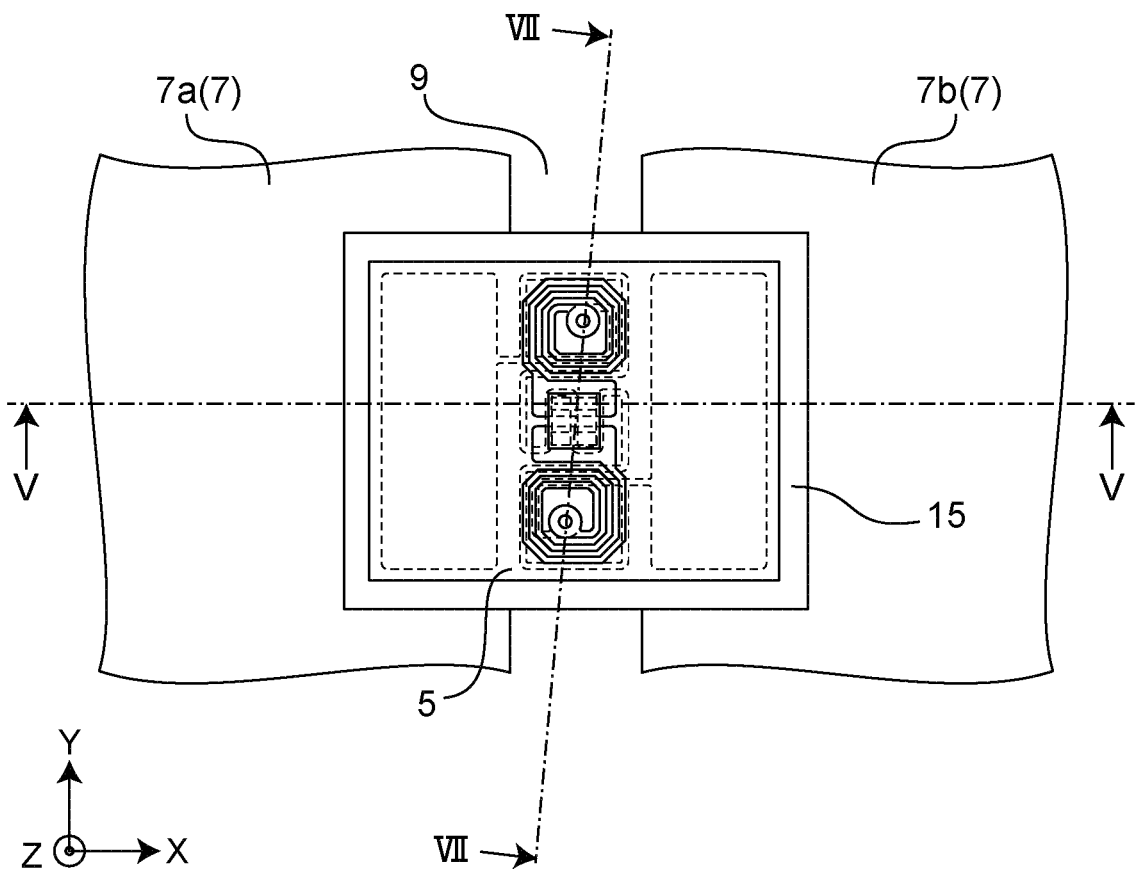
FIG. 4 is a perspective plan view of an RFID module.
Figure 5:
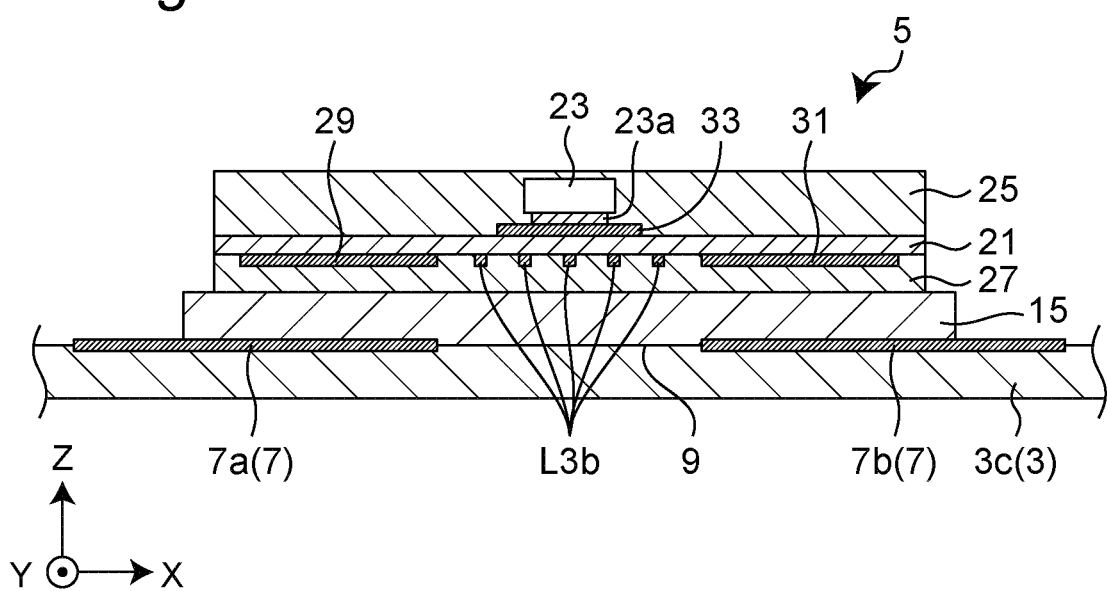
FIG. 5 is a sectional view taken along a line pointed by arrows V in FIG. 4 and viewed in the direction of the arrows V.
Figure 6:
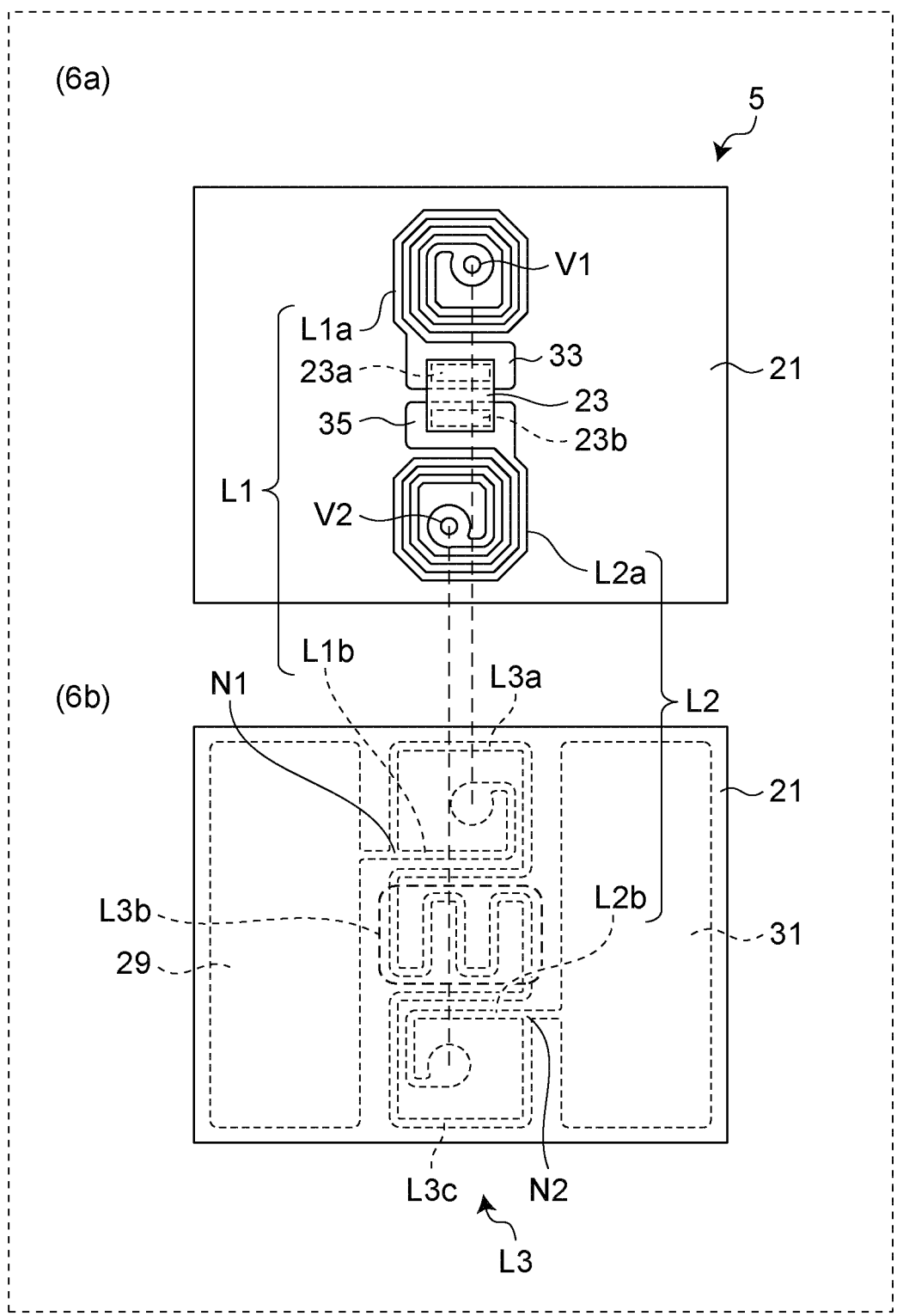
FIG. 6 is a plan view of a conductor pattern formed on a substrate of an RFID module, and includes 6a that is a plan view of the conductor pattern formed on an upper surface of the substrate of the RFID module and 6b that is a perspective plan view of the conductor pattern formed on a lower surface of the substrate as viewed from above.
Figure 7:
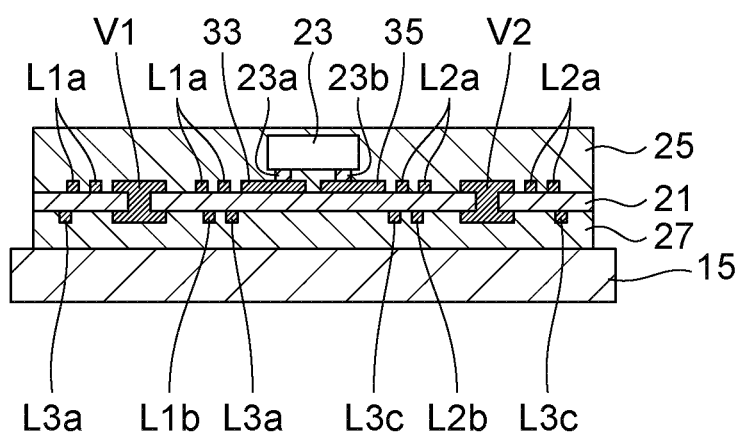
FIG. 7 is a sectional view taken along a line pointed by arrows VII in in FIG. 4 and viewed in the direction of the arrows VII.

Next, a configuration of the RFID module 5 will be described with reference to FIGS. 4 to 7. FIG. 4 is a perspective plan view of the RFID module 5, and FIG. 5 is a sectional view taken along the line pointed by the arrows V in FIG. 4 and viewed in the direction of the arrows V. FIG. 6 is a plan view of a conductor pattern formed on a substrate 21 of the RFID module 5, and includes 6a that is a plan view of the conductor pattern formed on an upper surface of the substrate 21 of the RFID module 5, and 6b that is a perspective plan view of the conductor pattern formed on a lower surface of the substrate 21 as viewed from above. FIG. 7 is a sectional view taken along the line pointed by the arrows VII in in FIG. 4 and viewed in the direction of the arrows VII. In the drawings, the X-Y-Z coordinate system is provided to facilitate understanding of the exemplary embodiment and does not limit the invention. An X-axis direction indicates a longitudinal direction of the RFID module 5, a Y-axis direction indicates a depth (width) direction thereof, and a Z-axis direction indicates a thickness direction thereof. The X, Y, and Z directions are orthogonal to each other.

As illustrated in FIG. 4, the RFID module 5 is electrically connected to the metal film 7 across the slit 9. Specifically, the RFID module 5 is bonded to an upper surface of each of the first metal region 7a and the second metal region 7b of the metal film 7 with an adhesive layer 11 such as a double-sided tape or a synthetic resin interposed therebetween.

As illustrated in FIG. 5, the RFID module 5 includes the substrate 21 and an RFIC 23 mounted on the substrate 21. The substrate 21 is a flexible substrate made of polyimide, for example. As further shown, the RFIC 23 is mounted on the upper surface of the substrate 21, and a protective film 25 is formed on the upper surface. The protective film 25 is made of an elastomer such as polyurethane or a hot melt agent such as ethylene vinyl acetate (EVA), for example. The substrate 21 has the lower surface to which a protection film 27 is also attached. The protection film 27 is a cover lay film such as a polyimide film (Kapton tape), for example.

Referring to FIG. 6, the substrate 21 is provided on the upper surface with a third electrode 33, a fourth electrode 35, a conductor pattern L1a of a main part of a first inductance element L1, and a conductor pattern L2a of a main part of a second inductance element L2. The third electrode 33 is connected to one end of the conductor pattern L1a, and the fourth electrode 35 is connected to one end of the conductor pattern L2a. In an exemplary aspect, these conductor patterns are obtained by patterning copper foil by photolithography, for example.

The substrate 21 is provided on the lower surface with a first electrode 29 and a second electrode 31 that are capacitively coupled to the first metal region 7a and the second metal region 7b of the metal film 7, respectively. The first electrode 29 and the second electrode 31 are each electrically connected to the metal film 7 with the slit 9 interposed therebetween. The substrate 21 is also provided on the lower surface with a part of a conductor pattern L1b of the first inductance element L1, and conductor patterns L3a, L3b (conductor patterns surrounded by two-dot chain lines), and L3c of a third inductance element L3. These conductor patterns are also obtained by patterning copper foil by photolithography, for example.

The part of the conductor pattern L1b of the first inductance element L1 and the conductor pattern L3a of the third inductance element L3 are each connected at one end to the first electrode 29. Similarly, the conductor pattern L2b of the second inductance element L2 and the conductor pattern L3c of the third inductance element L3 are each connected at one end to the second electrode 31. Between the other end of the conductor pattern L3a of the third inductance element L3 and the other end of the conductor pattern L3c, a conductor pattern L3b is connected.

The conductor pattern L1b of the first inductance element L1 and the conductor pattern L1a of the first inductance element L1 are connected at the other ends to each other via a via conductor V1. Similarly, the conductor pattern L2b of the second inductance element L2 and the conductor pattern L2a of the second inductance element L2 are connected at the other ends to each other via a via conductor V2.

In addition, as shown in FIG. 7, for example, the RFIC 23 is mounted on the third electrode 33 and the fourth electrode 35 formed on the upper surface of the substrate 21. That is, the RFIC 23 includes a terminal 23a connected to the third electrode 33, and a terminal 23b connected to the fourth electrode 35.

The first inductance element L1 and the conductor pattern L3a of the third inductance element L3 are formed in different layers of the substrate 21, and are disposed in a relationship in which their coil openings overlap each other. Similarly, the second inductance element L2 and the conductor pattern L3c of the third inductance element L3 are formed in different layers of the substrate 21, and are disposed in a relationship in which their coil openings overlap each other. The RFIC 23 is located on a surface of the substrate 21 and between the second inductance element L2 and the conductor patterns L3c of the third inductance element L3, and the first inductance element L1 and the conductor patterns L3a of the third inductance element L3.

The RFID module 5 includes a first current path CP1 passing through the upper surface and the lower surface of the substrate 21, and a second current path CP2 passing through the lower surface of the substrate 21. The first current path CP1 reaches the second electrode 31 from the first electrode 29 through a branch point N1, the conductor pattern L1b, the conductor pattern L1a, the RFIC 23, the conductor pattern L2a, the conductor pattern L2b, and a branch point N2. The second current path CP2 reaches the second electrode 31 from the first electrode 29 through the branch point N1, the conductor pattern L3a, the conductor pattern L3b, the conductor pattern L3c, and the branch point N2. Here, the first inductance element L1 including the conductor pattern L1a and the conductor pattern L1b connected to the conductor pattern L1a via the via conductor V1, and the second inductance element L2 including the conductor pattern L2a and the conductor pattern L2b connected to the conductor pattern L2a via the via conductor V2, are opposite in winding direction of flowing current, so that a magnetic field generated by the first inductance element L1 and a magnetic field generated by the second inductance element L2 cancel each other. In addition, the first current path CP1 and the second current path CP2 are formed in parallel with each other between the first electrode 29 and the second electrode 31.

Figure 8:
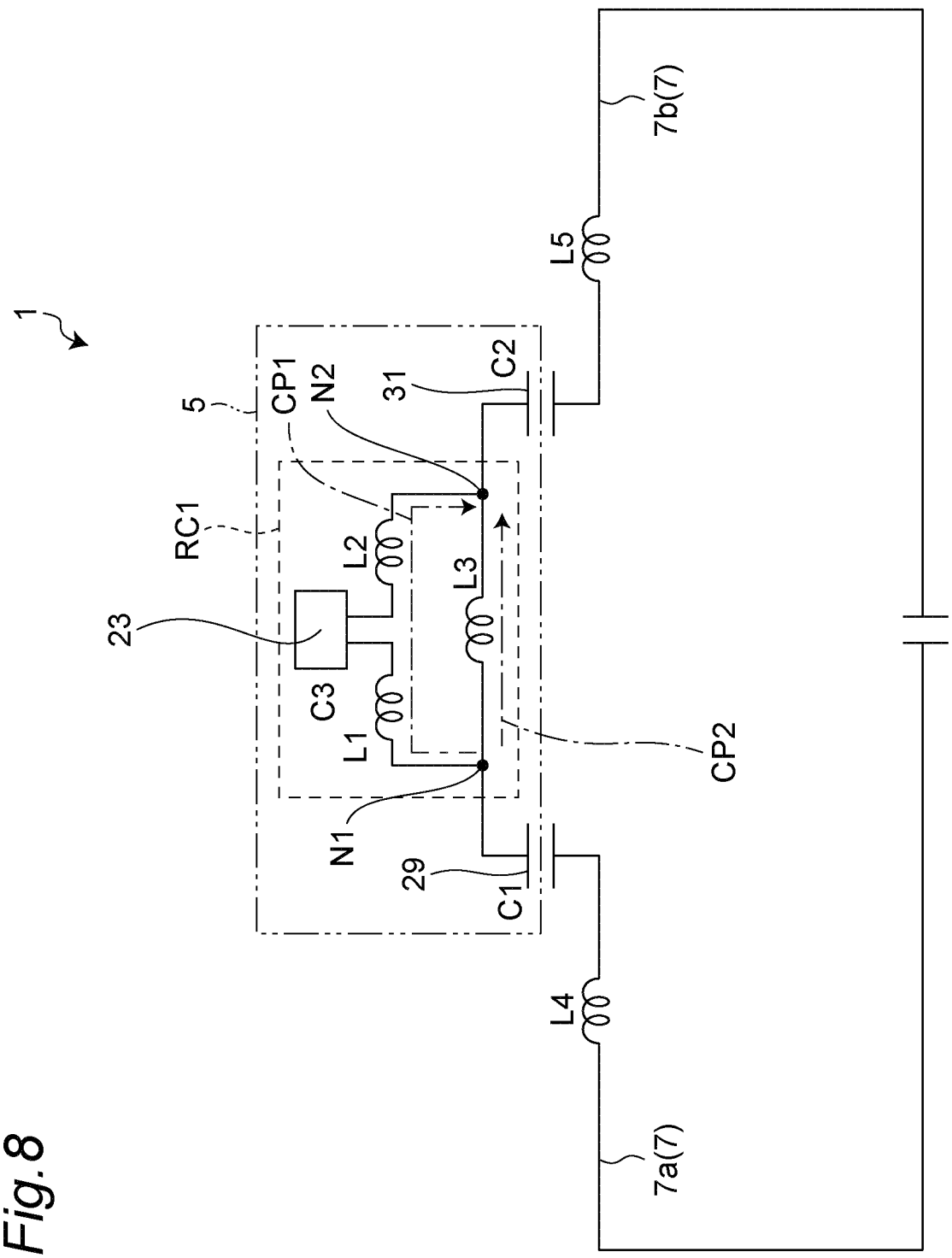
FIG. 8 is a circuit diagram of an RFID module.

Next, a circuit configuration of the RFID module 5 will be described with reference to FIG. 8. FIG. 8 is a circuit diagram of the RFID module 5.

As shown, the first current path CP1 in the RFID module 5 is a part of a parallel resonance circuit RC1 that is an LC parallel resonant circuit, and matches a radio wave at the communication frequency. Thus, when the metal film 7 receives the radio wave at the communication frequency, a current flows through the RFIC 23.

In addition, the RFID module 5 is provided with the parallel resonance circuit RC1. The parallel resonance circuit RC1 is a loop circuit including the first inductance element L1, the RFIC 23, the second inductance element L2, and the third inductance element L3. The parallel resonance circuit RC1 is configured to function as a filter circuit in operation.

The first metal region 7a, the first electrode 29, the adhesive layer 11, and the protection film 27 form a capacitor C1. Similarly, the second metal region 7b, the second electrode 31, the adhesive layer 11, and the protection film 27 form a capacitor C2. The first metal region 7a of the metal film 7 includes an inductance component serving as a fourth inductance element L4, and the second metal region 7b of the metal film 7 includes an inductance component serving as a fifth inductance element L5. FIG. 8 illustrates the first metal region 7a and the second metal region 7b that are capacitively coupled to form a loop circuit.

In the exemplary aspect, the parallel resonance circuit RC1 is designed to produce LC parallel resonance by performing impedance matching on radio waves at a communication frequency. This design allows the parallel resonance circuit RC1 to match with the RFIC at the communication frequency, and thus can secure a communication distance of the RFID module 5 at the communication frequency.

Figure 9:
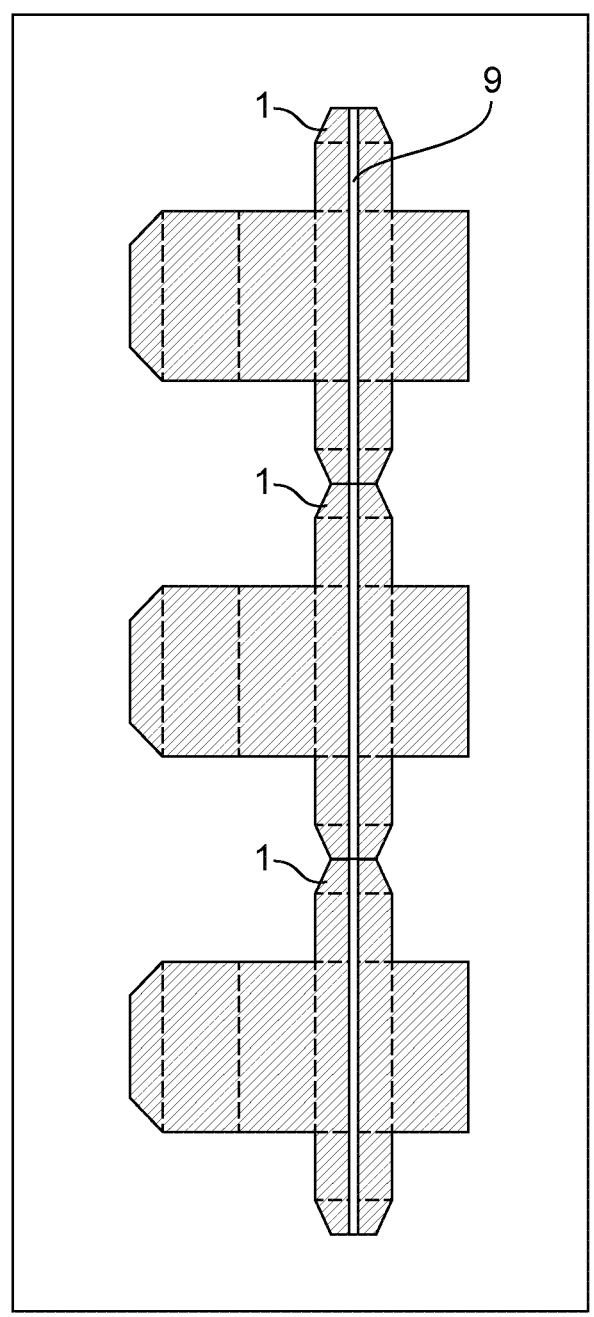
FIG. 9 is an explanatory diagram illustrating a manufacturing process of the container of the first exemplary embodiment.

As illustrated in FIG. 9, the container 1 of the first embodiment enables the metal film 7 to be formed on the entire surface of the first main surface 3s of the container 1 developed before assembled, and the slit 9 to be formed at a time for a plurality of the containers 1 before assembly.

As described above, the container 1 of the first embodiment includes the base material 3, the metal film 7, the slit 9, and the RFID module 5. As described above, the base material 3 has insulation properties and forms an outer shape of the container. The metal film 7 is formed on the first main surface 3s of the base material 3, with the slit 9 being formed in the metal film 7. The RFID module 5 includes an RFIC element 23, a filter circuit (e.g., a parallel resonance circuit RC1) that transmits a current caused by an electromagnetic wave at a specific resonance frequency serving as a communication frequency to the RFIC element 23, and the first and second electrodes 29 and 31 connected to the filter circuit. The metal film 7 is formed to wrap around an outer periphery of the container 1 in a direction intersecting the slit 9. The first electrode 29 and the second electrode 31 of the RFID module 5 are each electrically connected to the metal film 7 with the slit 9 interposed therebetween.

This configuration of the exemplary aspect enables the metal film 7 wrapping around the outer periphery of the container 1 in the direction intersecting the slit 9 to be used as an antenna electrode, and a current to flow through the RFIC 23 by series resonance. Thus, even the container 1 provided with the metal film 7 enables providing the container 1 that includes the RFID module 5 and is configured for performing wireless communication and suppressing deterioration in design properties.

Advantageously, the container 1 of the embodiment can be provided at a lower cost as compared with a container to which a conventional RFID module working with metal is attached. The conventional RFID module of a flag type is configured to protrude from the container, and communication characteristics deteriorate when the protrusion is broken. The conventional RFID module needs to protrude from the container, so that the degree of freedom of design properties is deteriorated. In contrast, the container 1 of the exemplary embodiment does not require the RFID module to protrude from the container, so that deterioration in the degree of freedom of design properties can be suppressed.

When the metal film 7 is irradiated with the electromagnetic wave at the communication frequency, the current Ir flowing in the direction intersecting the slit 9 is generated in the metal film 7. The current Ir flows through the metal film 7 to circulate along the outer periphery of the container 1. The metal film 7 is configured to function as a loop antenna as described above, so that communication characteristics as the loop antenna can be obtained.

The metal film 7 includes the first metal region 7a connected to the first electrode 29 of the RFID module 5, and the second metal region 7b connected to the second electrode 31 of the RFID module 5. The first metal region 7a and the second metal region 7b are electrically connected to each other via capacitive coupling in the outer peripheral direction of the container 1. When the metal film 7 is divided into the first metal region 7a and the second metal region 7b, and the first metal region 7a is capacitively coupled to the second metal region 7b, the degree of freedom of design properties can be improved as compared with a form in which the metal film 7 is continuously formed along the outer periphery of the container 1.

As further described above, the container 1 is an assembled box. The base material 3 includes the first surface 3a and the second surface 3b that each serve as a side surface of the box and have the first main surface 3s, and the flap 3g that is continuous with the first surface 3a to connect the first surface 3a to the second surface 3b with the adhesive layer 11 interposed therebetween. The flap 3g is provided with the first metal region 7a of the metal film 7. The second surface 3b is provided with the second metal region 7b of the metal film 7. This configuration enables facilitating electrical connection between the first metal region 7a and the second metal region 7b when the flap 3g is connected to the second surface 3b by the adhesive layer.

The slit 9 is formed in the flap 3g, and the RFID module 5 is disposed on the flap 3g. As a result, the RFID module 5 disposed on the first flap 3g continuous with the first surface 3a is attached to an inner surface of the second surface 3b in the container 1, and thus does not appear on an outer surface of the container 1. Thus, the design properties of the container 1 can be prevented from deteriorating.

Figure 10:
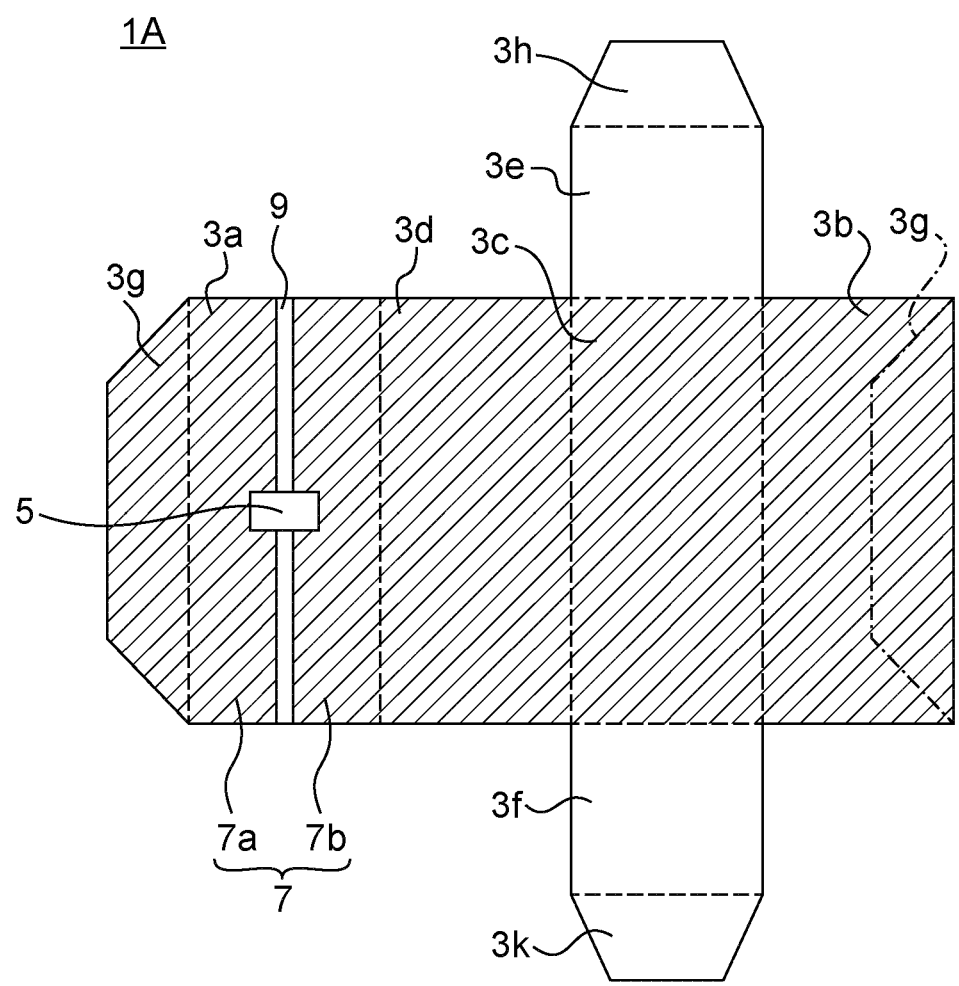
FIG. 10 is a developed view of a container according to a modification of the first exemplary embodiment.

Next, a first modification of the first exemplary embodiment will be described with reference to FIG. 10. FIG. 10 is a developed view of a container 1A according to the first modification of the first embodiment. The container 1A according to the first modification of the first embodiment is configured to shift the slit 9 of the container 1 of the first embodiment to left. Additionally, no metal film 7 is formed on a fifth surface 3e, a sixth surface 3f, a second flap 3h, and a third flap 3k. The container 1A in the first modification is substantially identical in other configurations to the container 1 of the first embodiment.

The container 1A according to the first modification includes a slit 9 formed in a first surface 3a of a base material 3. Specifically, the slit 9 extends from one end to the other end of the first surface 3a in a direction orthogonal to a direction in which the first surface 3a is adjacent to the fourth surface 3d and the first flap 3g. Thus, the metal film 7 includes a first metal region 7a formed on a part of the first surface 3a, and the first flap 3g. Similarly, the metal film 7 includes a second metal region 7b formed on a part of the first surface 3a, a second surface 3b, a third surface 3c, and a fourth surface 3d. This configuration enables the metal film 7 wrapping around the outer periphery of the container 1 in the direction intersecting the slit 9 to be used as an antenna electrode. Thus, even the container 1A provided with the metal film 7 enables providing the container 1A that includes the RFID module 5 and is configured to perform wireless communication and suppressing deterioration in design properties.

Second Exemplary Embodiment

Hereinafter, a container according to a second exemplary embodiment will be described.

The container of the second embodiment is different from the container of the first embodiment in that a slit 9 is formed in a flap 3g and an RFID module 5 is disposed in the flap 3g. This difference will be mainly described below. The second embodiment is described by eliminating description of an element similar in configuration, operation, and function to that of the first embodiment to avoid duplicated description. The container of the second embodiment is similar in configuration to the RFID module 5 of the first embodiment except for the points described below.

Figure 11:
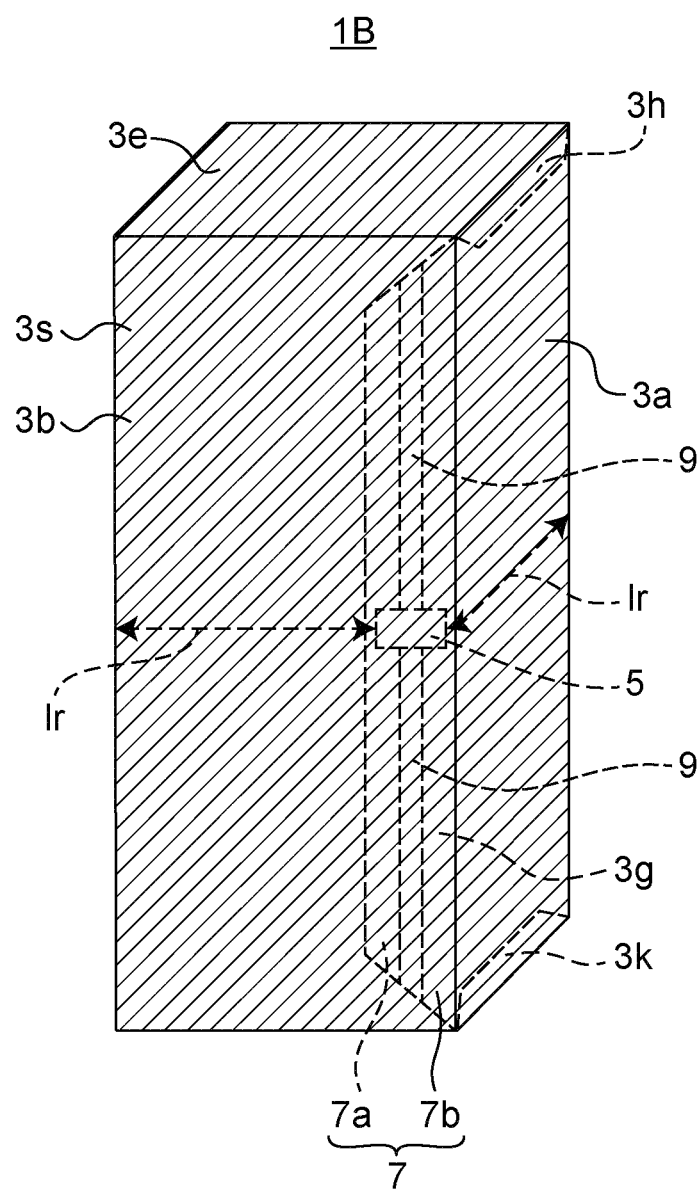
FIG. 11 is a general perspective view of a container of a second exemplary embodiment, the container having an RFID module.
Figure 12:
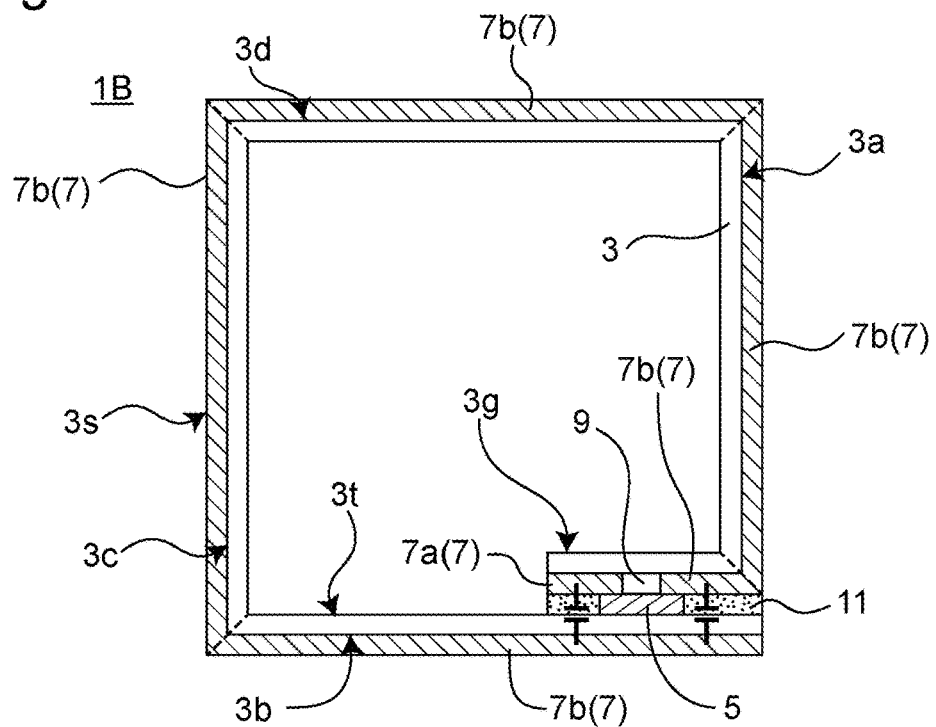
FIG. 12 is a schematic sectional view of the container in FIG. 11.
Figure 13:
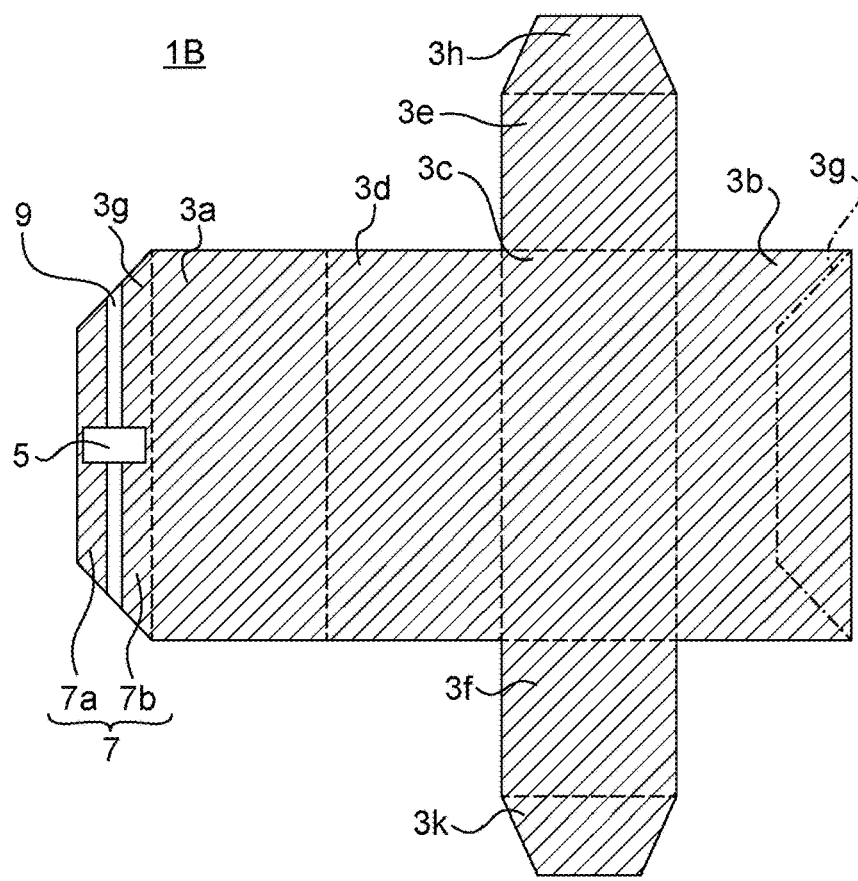
FIG. 13 is a developed view of the container in FIG. 11.

A schematic configuration of the container according to the second exemplary embodiment will be described. FIG. 11 is a general perspective view of a container 1B according to the second embodiment, with the container 1B including the RFID module 5. FIG. 12 is a schematic sectional view of the container 1B in FIG. 11, and FIG. 13 is a developed view of the container 1B in FIG. 11. FIG. 13 illustrates a part denoted by 3g and indicated by an alternate long and short dash line, the part indicating a part where a first flap 3g is connected to a back side of a second surface 3b.

As illustrated in FIGS. 11 to 13, the slit 9 is formed in the first flap 3g. The slit 9 extends from one end to the other end of the first flap 3g in a direction intersecting a direction in which the slit 9 is adjacent to a first surface 3a. The second embodiment causes a first metal region 7a of a metal film 7 to be formed in a part of the first flap 3g, i.e., in a part of the first flap 3g, the part being opposite to a side adjacent to the first surface 3a across the slit 9. In addition, the metal film 7 includes a second metal region 7b formed in a part of the first flap 3g that is adjacent to the first surface 3a across the slit 9, the first surface 3a, the second surface 3b, a third surface 3c, a fourth surface 3d, a second flap 3h, and a third flap 3k.

As further shown, the RFID module 5 is disposed on the metal film 7 across the slit 9 in the first flap 3g.

As illustrated in FIG. 12, the first flap 3g is connected to a second main surface 3t of the second surface 3b with an adhesive layer 11 interposed therebetween. The first metal region 7a formed in the first flap 3g and the second metal region 7b formed in the second surface 3b are electrically connected to each other via capacitive coupling. As a result, there is no potential difference between the first metal region 7a and the second metal region 7b, and then the metal film 7 functions as a loop antenna.

As described above, the container 1B of the second embodiment is configured such that the slit 9 is formed in the flap 3g, and the RFID module 5 is disposed in the flap 3g. This configuration allows the RFID module 5 disposed on the flap 3g continuous with the first surface 3a to be attached to an inner surface (i.e., the second main surface 3t) of the second surface 3b in the container 1B, and thus the RFID module 5 does not appear on an outer surface of the container 1B. Thus, the design properties of the container 1B are prevented from deteriorating.

Figure 14:
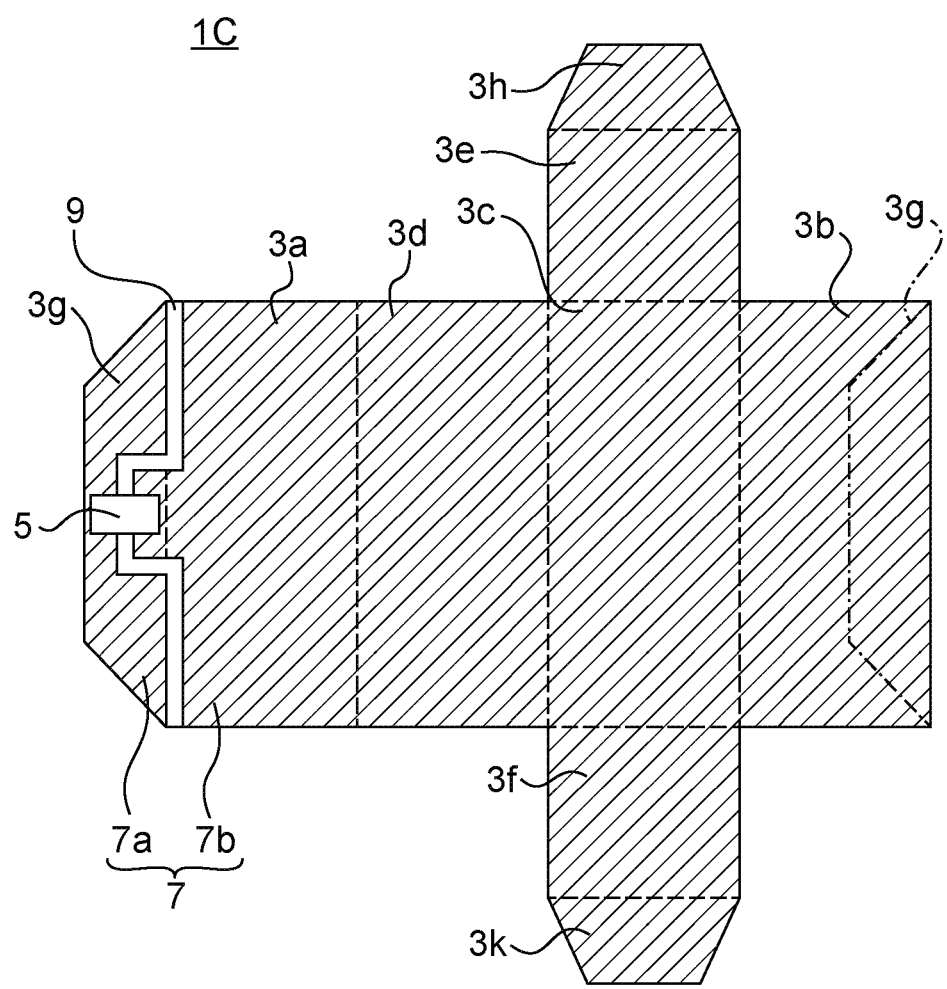
FIG. 14 is a developed view of a container according to a modification of the second exemplary embodiment.

Next, a second modification of the second embodiment will be described with reference to FIG. 14. FIG. 14 is a developed view of a container 1C according to the second modification of the second embodiment. The container 1C according to the second modification includes a slit 9 that is formed by bending the slit 9 of the container 1B according to the second embodiment, and that extends along a boundary between a first flap 3g and a first surface 3a. The container 1C in the second modification is substantially identical in other configurations to the container 1B of the second embodiment.

The container 1C according to the second modification includes the slit 9 that is formed in a bent shape, and that extends along the boundary between the first flap 3g and the first surface 3a. The boundary between the first flap 3g and the first surface 3a is a part corresponding to a corner in the container 1C. Even such a configuration enables preventing deterioration in design properties of the container 1C because an RFID module 5 does not appear on an outer surface of the container 1C. When the slit 9 is formed at the boundary between the first flap 3g and the first surface 3a, the first metal region 7a formed in the first flap 3g can be increased in area. As a result, a part where the first metal region 7a and the second metal region 7b are capacitively coupled can be increased in area, and thus the first metal region 7a and the second metal region 7b can be capacitively coupled more stably.

Figure 15:
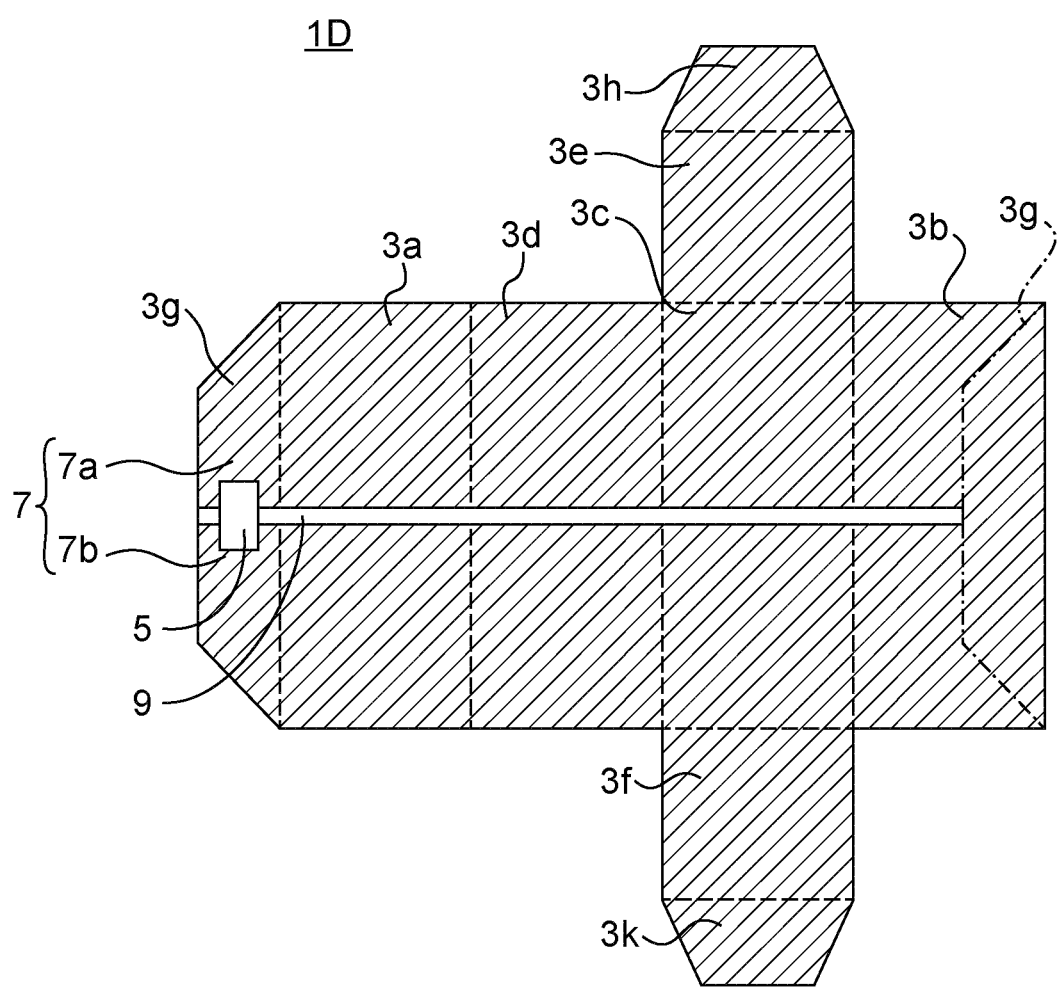
FIG. 15 is a developed view of a container according to a modification of the second exemplary embodiment.

Next, a third modification of the second embodiment will be described with reference to FIG. 15. FIG. 15 is a developed view of a container 1D according to the third modification of the second embodiment. As shown, the container 1D according to the third modification is configured such that a slit 9 extends in a lateral direction across the first flap 3g, the first surface 3a, the fourth surface 3d, the third surface 3c, and the second surface 3b in the container 1B according to the second embodiment. Otherwise, the container 1D is substantially identical in other configurations to the container 1B of the second embodiment. The slit 9 in the third modification has one end extending to an end of the first flap 3g. The slit 9 has the other end that does not extend to an end of the second surface 3b and stops in the middle of the second surface 3b. The slit 9 is preferably formed across three or more surfaces of the container 1D. The slit 9 has the other end formed to extend to a region where the first flap 3g and the second surface 3b are capacitively coupled, for example. This configuration allows a part where the first flap 3g and the second surface 3b are capacitively coupled in the second surface 3b to include a first metal region 7a and a second metal region 7b that are physically connected without being divided by the slit 9. The slit 9 in the third modification has a length in a longitudinal direction, the length being determined to allow a current flowing through a metal film 7 to flow around an outer periphery of the container 1D in a direction intersecting the longitudinal direction of the slit 9. This configuration enables the metal film 7 to function as a loop antenna. Moreover, the RFID module 5 does not appear on the outer surface of the container 1D, so that deterioration in design properties of the container 1D are prevented.

Third Exemplary Embodiment

Hereinafter, a container 1 according to a third exemplary embodiment will be described.

The container 1 of the third embodiment is different from the container 1 of the first embodiment in sheet resistance of a metal film 7. This difference will be mainly described below. The third embodiment may be described by eliminating description of an element similar in configuration, operation, and function to that of the first embodiment to avoid duplicated description. The container 1 of the third embodiment is similar in configuration to the RFID module 5 of the first exemplary embodiment except for the points described below.

The sheet resistance of the metal film 7 of the container 1 of the third embodiment is larger than the sheet resistance of the metal film 7 of the container 1 of the first embodiment.

The metal film 7 having a large sheet resistance causes the following problems that have not occurred in the container 1 of the first embodiment.

In particular, the container 1 of the first embodiment radiates an electromagnetic wave by producing a resonance phenomenon in the entire metal film 7 as an antenna electrode. The metal film 7 in the first embodiment has a thickness of more than 5 μm and 40 μm or less, and has a sheet resistance of $0.05\Omega/\square$ (ohms per square) or less, for example.

The metal film of the container is usually formed for preventing food oxidation and improving design properties. Even when the metal film has a thickness of a value of one digit in units of μm such as 5 μm, for example, a design printed on the metal film by gravure printing or offset printing has a printing thickness of about 1 μm. In this case, the thickness of the metal film as antenna foil causes a step in the printed design, and thus causing printing deviation (e.g., blur or bleed). For this reason, a design cannot be directly printed on a container to which conventional antenna foil is attached.

When a metal film as an antenna is formed by a vapor deposition method, the metal film has a further reduced thickness of about 10 Å (=1 nm) to 5000 Å (=500 nm). Although the metal film having such a thickness does not cause a step even when gravure printing is performed on the metal film, the metal film (e.g., a deposited film) having such a thickness, such as aluminum foil, has a sheet resistance increasing to about $0.5\Omega/\square$ to $50\Omega/\square$, for example, due to a small film thickness.

The metal film increased in sheet resistance causes radiation power to be almost converted into heat due to resistance of metal foil even when a series resonance phenomenon is caused to generate a standing wave in the entire antenna electrode made of the metal film, so that electromagnetic wave radiation cannot be performed as an antenna.

Additionally, a matching circuit unit between the RFIC and the antenna also becomes equal in thickness to the metal film, so that a resistance value of the matching circuit unit increases causing increase in matching loss, and thus the RFID module does not operate.

Although an antenna electrode made of a metal film thin in thickness cannot generate electromagnetic wave radiation due to a (series) resonance phenomenon as described above, the metal film having received an electromagnetic wave causes a current to flow through the metal film to cancel the electromagnetic wave, and thus shielding the electromagnetic wave. This current is also called eddy current. When the eddy current flows, a current component flowing through the metal film is not caused by the resonance phenomenon of the antenna electrode, and thus can correspond to all frequency components regardless of an electrode pattern shape. This eddy current is known as an effect of metal shielding, but is not usually used as an antenna.

The RFID module 5 includes the parallel resonance circuit RC1 as a filter circuit that transmits only a current at a specific resonance frequency to the RFIC 23, so that an eddy current is selected by frequency selection and a current flows through the RFIC 23 to transmit energy. Only a specific frequency is selected between the metal film 7 as an antenna electrode and the RFID module 5 to perform impedance matching, and thus enabling energy transmission between the RFIC 23 and the metal film 7. It is considered that the metal film 7 can communicate with the RFIC 23 as described above.

Thus, the container 1 of the third embodiment enables even the metal film 7 having a high sheet resistance to perform communication by using an eddy current that has not been conventionally used.

The metal film 7 having a high sheet resistance is caused not only by a thickness of the metal film 7, but also by a manufacturing method of the metal film 7. For example, when the metal film 7 is made of a conductive paste such as an Ag paste, the metal film 7 may have a sheet resistance of $0.5\Omega/\square$ or more. Even in such a case, the container 1 of the third embodiment enables wireless communication.

Additional Exemplary Embodiments

FIGS. 16 to 19 are each a general perspective view of a container according to another embodiment.

Figure 16:
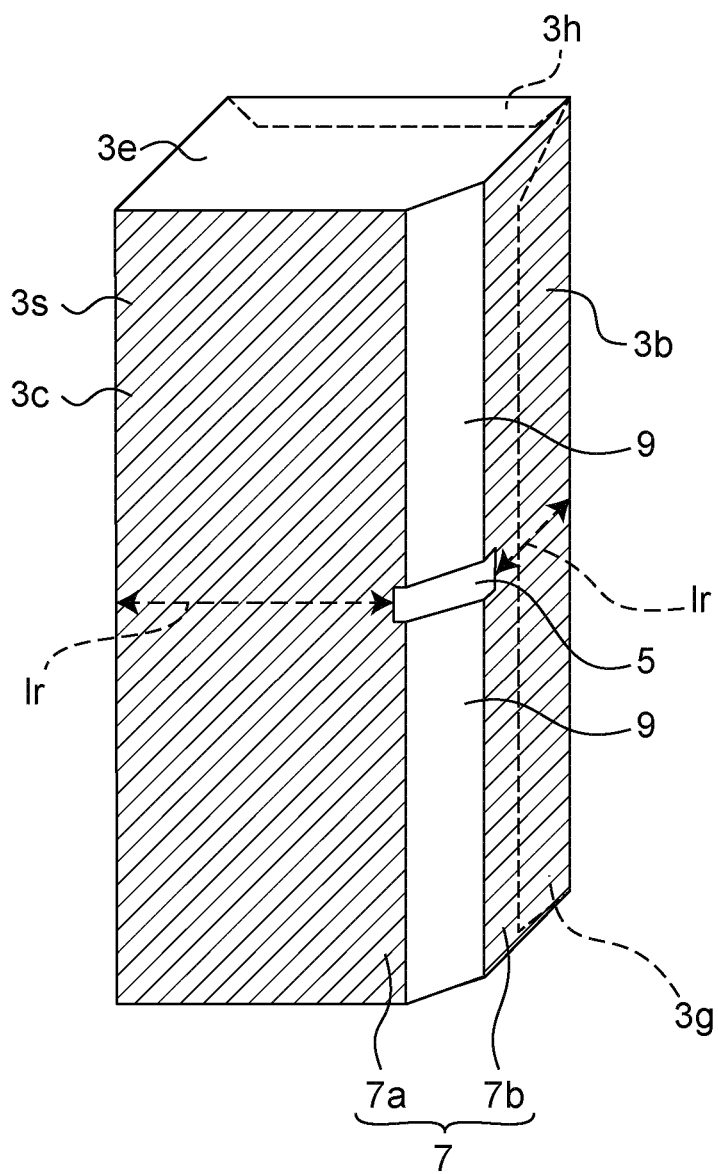
FIG. 16 is a general perspective view of a container according to an additional exemplary embodiment.

As illustrated in FIG. 16, a container 1E may include a corner chamfered, and a slit 9 formed at the corner chamfered. Specifically, a corner where a second surface 3b and a third surface 3c of the container 1E are connected is chamfered, and the slit 9 is formed in a chamfered surface. The container 1E includes a fifth surface 3e and a sixth surface 3f that are provided with no metal film 7. When the container 1E is irradiated with an electromagnetic wave at a communication frequency, a current flows in a direction intersecting the slit 9 in the container 1E through a metal film 7 formed on the third surface 3c, a fourth surface 3d, a first flap 3g, and the second surface 3b of the container 1E.

Figure 17:
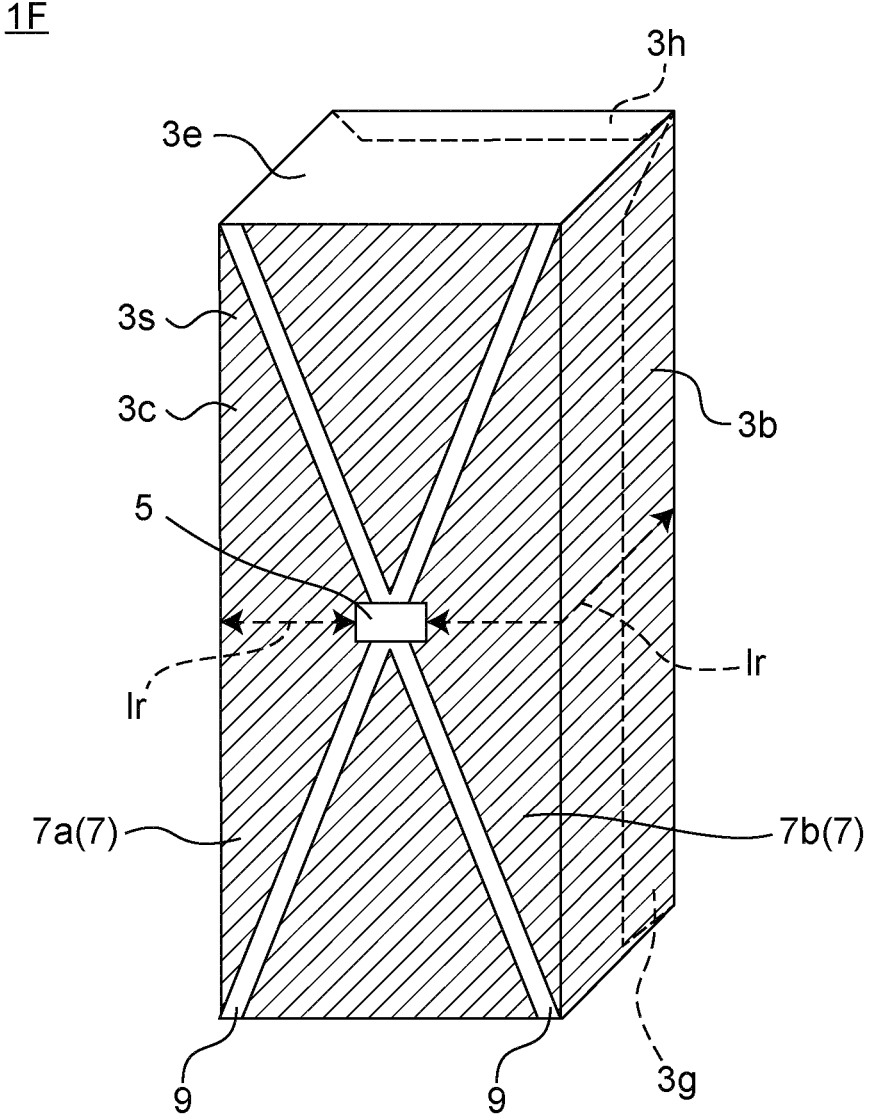
FIG. 17 is a general perspective view of a container according to yet another exemplary embodiment.

As illustrated in FIG. 17, a container 1F may be provided with two slits 9 formed to intersect with each other. Specifically, the two slits 9 are formed to intersect with each other on the third surface 3c of the container 1F. The two slits 9 intersect with each other at a part where an RFID module 5 is disposed. The container 1F includes a fifth surface 3e and a sixth surface 3f that are provided with no metal film 7. When the container 1F is irradiated with an electromagnetic wave at a communication frequency, a current flows in a direction intersecting the slit 9 in the container 1F through a metal film 7 formed on a part of the third surface 3c, a fourth surface 3d, a first surface 3a, a first flap 3g, and a second surface 3b of the container 1F.

Figure 18:
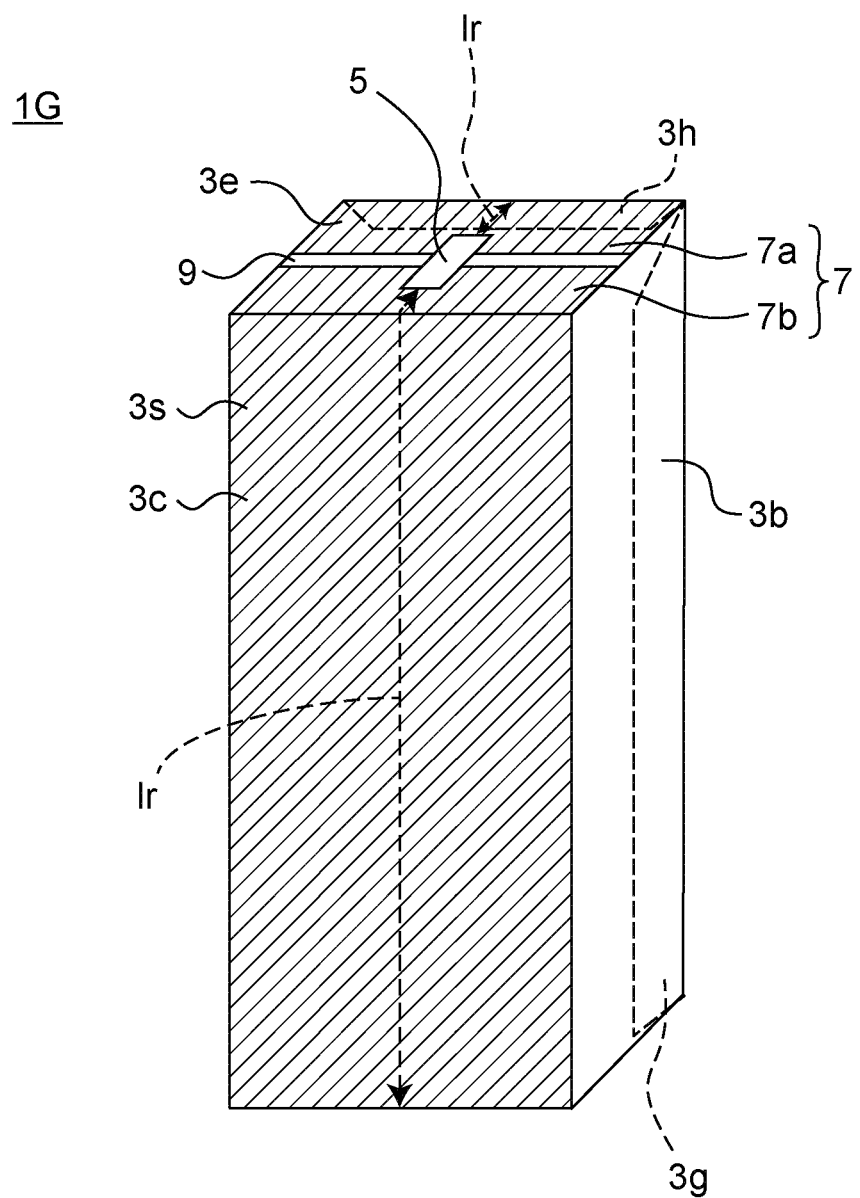
FIG. 18 is a general perspective view of a container according to yet another exemplary embodiment.

As illustrated in FIG. 18, a container 1G may be configured such that a slit 9 is formed in a fifth surface 3e, and a RFID module 5 is disposed on the fifth surface 3e. Specifically, the slit 9 extends in a lateral direction in the fifth surface 3e of the container 1G from an end on a second surface 3b side to an end on a fourth surface 3d side. This configuration allows a first metal region 7a to be formed on a second flap 3h side across the slit 9, and a second metal region 7b to be formed on a third surface 3c side across the slit 9. Specifically, the first metal region 7a is formed in a part of the fifth surface 3e on the second flap 3h side and a second flap 3h across the slit 9. The second metal region 7b is formed on a part of the fifth surface 3e on the third surface 3c side, a third surface 3c, a sixth surface 3f, and a first surface 3a across the slit 9. When the second flap 3h is connected to an inner surface of the first surface 3a, the first metal region 7a is electrically connected to the second metal region 7b via capacitive coupling. When the container 1G is irradiated with an electromagnetic wave at a communication frequency, a current flows in a direction intersecting the slit 9 in the container 1G through a metal film 7 formed on the fifth surface 3e, the third surface 3c, the sixth surface 3f, the first surface 3a, and the second flap 3h of the container 1G.

Figure 19:
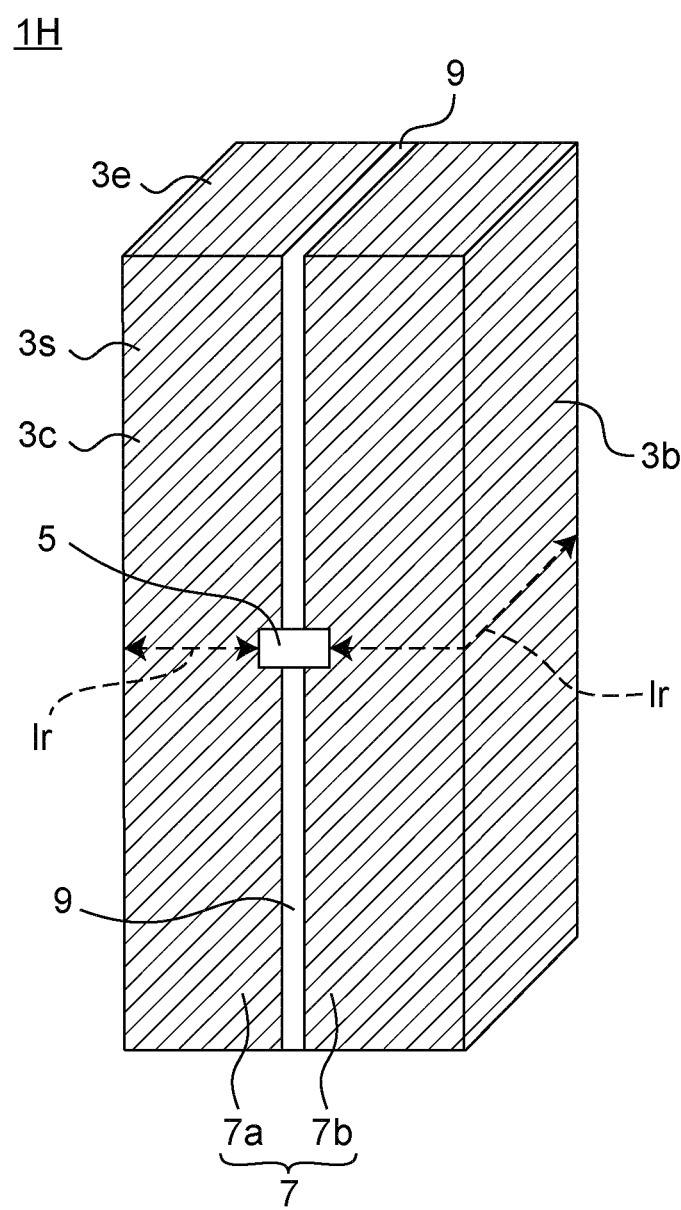
FIG. 19 is a general perspective view of a container according to yet another exemplary embodiment.

As illustrated in FIG. 19, a container 1H is provided as a container without flaps 3g, 3h, and 3k. The container 1H includes a first surface 3a and a second surface 3b that are physically connected. A metal film 7 is formed on the entire surface of a base material 3 except for a slit 9. This configuration allows the first surface 3a to be directly and electrically connected to the second surface 3b instead of via capacitive coupling. When the container 1H is irradiated with an electromagnetic wave at a communication frequency, a current flows in a direction intersecting the slit 9 in the container 1H through the metal film 7 formed on a third surface 3c, a fourth surface 3d, the first surface 3a, and the second surface 3b of the container 1H.

The container having the form as illustrated in each of FIGS. 16 to 19 also can achieve an effect similar to that of the container 1 of the first embodiment.

In general, it is noted that the present invention is not limited to the embodiments described above, and modifications can be made as follows.

(1) Although the container 1 is assembled in each of the above embodiments, the present invention is not limited thereto. The container 1 can be a bottle or a plastic bottle in alternative aspects.

(2) Although the communication frequency band is the UHF band in each of the above embodiments, the present invention is not limited thereto. Wireless communication can be performed with a high frequency signal at a frequency (e.g., a carrier frequency) for communication in an HF band. In this case, the metal film 7 is designed to have an entire length orthogonal to the slit 9, the entire length allowing a high frequency signal in the HF band to be received. The HF band is a frequency band of 13 MHz or more and 15 MHz or less.

(3) Although the RFID module 5 in each of the above embodiments is attached to the first metal region 7*a* and the second metal region 7*b*, the present invention is not limited thereto. The RFIC 23 can be electrically connected to the first metal region 7*a* and the second metal region 7*b* via an inductor. In this case, the inductor is formed on an antenna pattern side. When the inductor is formed on the antenna pattern side, the metal film 7 may be reduced in sheet resistance by attaching a metal foil as in the first embodiment.

(4) The metal film 7 in each of the above embodiments may be configured such that a coating material is applied to a region other than a part to which the RFID module 5 is attached to form a pattern, thereby improving design properties of the container 1. The metal film 7 and the slit 9 cam be formed on the second main surface 3*t* of the base material 3 instead of the first main surface 3*s*. That is, the metal film 7 and the slit 9 may be formed inside the container 1.

In general, although the present invention has been described in each of the embodiments with a certain degree of detail, the disclosure content of these embodiments should be changed in the details of the configuration, and change in combination and order of elements in each of the embodiments can be achieved without departing from the scope of claims and the spirit of the present invention.

REFERENCE NUMERALS 1, 1A, 1B, 1C, 1D, 1E, 1F, 1G, 1H container
3 base material
3*a* first surface
3*b* second surface
3*c* third surface
3*d* fourth surface
3*e* fifth surface
3*f* sixth surface
3*g* first flap
3*h* second flap
3*k* third flap
3*s* first main surface
3*t* second main surface
5 RFID module
5*a* front surface
5*b* back surface
7 metal film
7*a* first metal region
7*b* second metal region
9 slit
11 adhesive layer
15 adhesive
21 module substrate
23 RFIC
23*a* terminal
23*b* terminal
25 protective film
27 protection film
29 first electrode
31 second electrode
33 third electrode
35 fourth electrode
37, 39 conductor pattern
L1 first inductance element
L1*a* conductor pattern
L2*a* conductor pattern
L2 second inductance element
L2*a* conductor pattern
L2*b* conductor pattern
L3 third inductance element
L3*a* conductor pattern
L3*b* conductor pattern
L3*c* conductor pattern
L4 fourth inductance element
L5 fifth inductance element
CP1 first current path
CP2 second current path
C1 capacitor
C2 capacitor

The invention claimed is:

1. A container including a radio frequency identification (RFID) module, the container comprising:
an insulating base material that defines an outer shape of the container;
a metal film disposed on a first main surface of the insulating base material; and
a slit disposed in the metal film,
wherein the RFID module includes an RFIC element, a filter circuit, and first and second electrodes connected to the filter circuit,
wherein the metal film wraps around an outer periphery of the container in a direction that intersects the slit, and
wherein the first electrode and the second electrode of the RFID module are electrically connected to the metal film across the slit that extends between the first electrode and the second electrode.

2. The container including the RFID module according to claim 1, wherein the filter circuit is configured to transmit a current caused by an electromagnetic wave at a resonance frequency that serves as a communication frequency to the RFIC element.

3. The container including the RFID module according to claim 1, wherein a current flowing in a direction that intersects the slit is generated in the metal film when the metal film is irradiated with an electromagnetic wave, such that the current flows through the metal film to circulate along the outer periphery of the container.

4. The container including the RFID module according to claim 1, wherein the metal film includes a first metal region connected to the first electrode of the RFID module and a second metal region connected to the second electrode of the RFID module.

5. The container including the RFID module according to claim 4, wherein the first metal region is connected to the second metal region with the insulating base material and an adhesive layer interposed therebetween.

6. The container including the RFID module according to claim 4, wherein the first metal region and the second metal region are electrically connected to each other via capacitive coupling in an outer peripheral direction of the container.

7. The container including the RFID module according to claim 6, wherein:
the container is an assembled box,
the base material includes a first surface and a second surface that are side surfaces of the box and include the first main surface, and a flap that connects the first surface and the second surface with an adhesive layer, with the flap being continuous with the first surface,
the first metal region of the metal film is disposed on the flap, and
the second metal region of the metal film is disposed on the second surface.

8. The container including the RFID module according to claim 7, wherein the slit is disposed in the flap, and the RFID module is disposed on the flap.

9. The container including the RFID module according to claim 1, wherein the filter circuit is an LC parallel resonant circuit.

10. The container including the RFID module according to claim 1, wherein the metal film has a sheet resistance of at least 0.5 Ω/□.

11. The container including the RFID module according to claim 10, wherein the metal film has a thickness of 1 nm or more and 500 nm or less.

12. The container including the RFID module according to claim 1, wherein the metal film is configured as a loop antenna.

13. The container including the RFID module according to claim 1, wherein the slit disposed in the metal film is configured by exposing the insulating base material from the metal film.

14. The container including the RFID module according to claim 1, wherein the insulating base material defines the outer shape of the container to have a chamfered corner with the slit disposed in the chamfered corner.

15. The container including the RFID module according to claim 1, wherein the slit comprises a bent section with the RFID module coupled to opposing sides of the bent section.

16. A container including a radio frequency identification (RFID) module, the container comprising:
an insulating base material that defines a shape of the container;
a metal film disposed on a surface of the insulating base material; and
a slit that extends in the metal film so as to expose the insulating base material,
wherein the metal film wraps around the container and intersects the slit, and
wherein the RFID module includes first and second electrodes that are electrically connected to the metal film, with the first electrode and the second electrode being on opposite sides of the slit.

17. The container including the RFID module according to claim 16,
wherein the RFID module further includes an RFIC element and a filter circuit that is configured to transmit a current caused by an electromagnetic wave at a resonance frequency that serves as a communication frequency to the RFIC element, and
wherein the first and second electrodes are connected to the filter circuit.

18. The container including the RFID module according to claim 16, wherein a current flowing in a direction that intersects the slit is generated in the metal film when the metal film is irradiated with an electromagnetic wave, such that the current flows through the metal film to circulate along an outer periphery of the container.

19. The container including the RFID module according to claim 16,
wherein the metal film includes a first metal region connected to the first electrode of the RFID module and a second metal region connected to the second electrode of the RFID module, and
wherein the first metal region and the second metal region are electrically connected to each other via capacitive coupling in an outer peripheral direction of the container.

20. The container including the RFID module according to claim 19, wherein:
the container is an assembled box,
the base material includes a first surface and a second surface that are side surfaces of the box and include the first main surface, and a flap that connects the first surface and the second surface with an adhesive layer, with the flap being continuous with the first surface,
the first metal region of the metal film is disposed on the flap, and
the second metal region of the metal film is disposed on the second surface.

* * * * *